(12) United States Patent
Kimura et al.

(10) Patent No.: US 6,793,386 B2
(45) Date of Patent: Sep. 21, 2004

(54) KNEADING DEVICE

(75) Inventors: Tsuguo Kimura, Yamato (JP); Sumio Masukawa, Yokohama (JP); Yoshihiro Ohno, Tokyo (JP); Akishige Kanai, Osaka (JP)

(73) Assignee: Morinaga & Co., Ltd., Tokyo (JP)

( * ) Notice: Subject to any disclaimer, the term of this patent is extended or adjusted under 35 U.S.C. 154(b) by 0 days.

(21) Appl. No.: 10/397,253

(22) Filed: Mar. 27, 2003

(65) Prior Publication Data

US 2003/0169636 A1 Sep. 11, 2003

Related U.S. Application Data

(62) Division of application No. 09/913,460, filed as application No. PCT/JP00/07900 on Nov. 13, 2000.

(51) Int. Cl.[7] ................................................. B01F 7/02
(52) U.S. Cl. .......................... 366/97; 366/297; 366/299; 366/325.8
(58) Field of Search .......................... 366/97, 297, 298, 366/299, 300, 301, 325.6, 325.8, 325.9, 325.91, 313

(56) References Cited

U.S. PATENT DOCUMENTS

| 1,228,550 A | * | 6/1917 | Goger ........................... 366/97 |
| 1,487,208 A | | 3/1924 | Cooke et al. |
| 2,445,919 A | * | 7/1948 | Mitchell ................... 366/325.8 |
| 2,526,367 A | * | 10/1950 | Keltenbach et al. ......... 366/313 |
| 2,535,647 A | * | 12/1950 | Millman et al. .............. 366/97 |
| 2,611,590 A | * | 9/1952 | Jebens ......................... 366/301 |
| 2,960,045 A | | 11/1960 | Pentzlin |
| 3,169,752 A | | 2/1965 | Laubarede |
| 3,456,599 A | | 7/1969 | Baker |
| 3,486,194 A | | 12/1969 | Parks |
| 3,570,588 A | | 3/1971 | Wheeler |
| 3,650,511 A | * | 3/1972 | Henschel ..................... 366/298 |
| 3,652,062 A | | 3/1972 | Baker |
| 3,667,971 A | | 6/1972 | Brunner |
| 3,689,035 A | * | 9/1972 | List ............................. 366/297 |
| 4,110,844 A | | 8/1978 | Nakamura |
| 4,166,722 A | | 9/1979 | Geissler et al. |
| 4,199,263 A | | 4/1980 | Menges et al. |
| 4,275,647 A | | 6/1981 | Chambers et al. |
| 4,334,789 A | * | 6/1982 | Eusterbarkey ............... 366/98 |
| 4,600,313 A | * | 7/1986 | Moroo et al. ............... 366/313 |
| 4,648,316 A | | 3/1987 | Ruffinatti |
| 4,650,337 A | * | 3/1987 | Otto ............................ 366/97 |
| 4,816,279 A | | 3/1989 | Katoh et al. |
| 4,842,879 A | | 6/1989 | Ek |
| 4,949,630 A | | 8/1990 | Knebl |
| 4,950,494 A | | 8/1990 | Katoh et al. |
| 5,000,900 A | | 3/1991 | Baumgartner |
| 5,002,791 A | | 3/1991 | Knebl |
| 5,191,832 A | | 3/1993 | Tsay |
| 5,290,577 A | | 3/1994 | Tashiro |
| 5,458,894 A | | 10/1995 | Knebl et al. |
| 5,660,102 A | | 8/1997 | Askman et al. |
| 5,758,962 A | * | 6/1998 | Ismar .......................... 366/97 |
| 5,835,827 A | * | 11/1998 | Kishimoto .................. 366/313 |
| 5,836,689 A | | 11/1998 | Wieland |
| 6,001,403 A | | 12/1999 | Kobayashi |

FOREIGN PATENT DOCUMENTS

| CA | 1286142 | 7/1991 |
| GB | 2 191 378 A | 12/1987 |

(List continued on next page.)

*Primary Examiner*—Tony G. Soohoo
(74) *Attorney, Agent, or Firm*—Nixon & Vanderhye P.C.

(57) ABSTRACT

A kneading device kneads a main raw material of high viscosity and a secondary raw material of liquid or powder and continuously delivers a kneaded raw material obtained, and a ropesizer includes a sheet forming unit, and a delivering unit applies a second raw material onto a first raw material, which is elongated into a sheet shape and is conveyed by the sheet forming unit, so as to be in a strand form.

5 Claims, 9 Drawing Sheets

FOREIGN PATENT DOCUMENTS

| | | |
|---|---|---|
| IT | 22276 | 10/1988 |
| JP | 33-2095 | 3/1958 |
| JP | 45-17574 | 7/1970 |
| JP | 52-68469 | 5/1977 |
| JP | 58-205476 | 11/1983 |
| JP | WO 87/01911 A | 4/1987 |
| JP | 62-151160 | 6/1987 |
| JP | 62-269736 A | 11/1987 |
| JP | 63-258527 | 10/1988 |
| JP | 1-128750 | 5/1989 |
| JP | 1-127446 | 8/1989 |
| JP | 6-22674 | 2/1994 |
| JP | 8-9887 | 1/1996 |
| JP | 8-238051 | 9/1996 |

* cited by examiner

KNEADING DEVICE

This application is a divisional of application Ser. No. 09/913,460 filed Aug. 15, 2001 which in turn is a §371 of PCT/JP00/07900 filed Nov. 13, 2000, the entire content of which is hereby incorporated by reference in this application.

TECHNICAL FIELD

The present invention relates to a kneading device and a ropesizer which are suitable for producing confectionery such as a soft candy. In particular, the present invention relates to a kneading device and a ropesizer which make possible a continuous production of such confectionery.

BACKGROUND ART

Recently, soft candies are being marketed that have superior softness when initially chewed and do not adhere to the teeth. Such soft candies may be produced by, for instance, the following process:

a first step in which a saccharide, water, vegetable oil, and emulsifier are mixed and emulsified to prepare a soft candy base raw material liquid;

a second step in which the soft candy base raw material liquid is boiled down to obtain a high viscosity raw material which is used as a soft candy base;

a third step in which after mixing and boiling down sucrose, water, and glucose syrup, the mixture is cooled and crystals are precipitated to obtain a fine sucrose crystal composition;

a fourth step in which a low viscosity raw material including the fine sucrose crystal composition obtained in the third step is added to and mixed with the high viscosity raw material (the soft candy base) obtained in the second step to obtain a high viscosity mixture (i.e., a raw material mixture);

a fifth step in which saccharide, water, and foaming protein such as gelatin are mixed and whipped to obtain a frappe;

a sixth step in which a secondary raw material such as the frappe obtained in the fifth step is added to and mixed with the mixture (the raw material mixture), which is obtained in the fourth step and is used as a primary raw material, to obtain a soft candy composition in which a large amount of air is included to give a characteristic of a soft candy; and, a seventh step in which two kinds of the soft candy compositions having different flavor are prepared in the sixth step, and they are formed into a product by wrapping one of the soft candy compositions with the other one of the soft candy compositions.

In the production process mentioned above, since it is difficult to sufficiently carry out a mixing (mulling) process and, at the same time, continuously convey the resultant mixture, especially in the fourth step in which the low viscosity raw material including the fine sucrose crystal composition is added to and mixed with the high viscosity raw material (the soft candy base) to obtain the high viscosity mixture (the raw material mixture), a batch type production process is conventionally adopted and a continuous production process is not employed.

Also, for the same reason as above, a batch type production process is adapted for the sixth step in which the secondary raw material such as the frappe is added to and mixed with the mixture (the raw material mixture) to obtain a soft candy composition, and a continuous production process is not utilized.

Moreover, in the seventh step in which one of the materials is wrapped up by the other to be formed into a product, a method is adopted in which an extrusion instrument, for instance, an extruder, is used and the nozzle thereof is made duplex to form the product, or in which the product is prepared by hand.

However, since the raw material to be mixed (mulled) deteriorates over time and the physical properties of the products differ at the initial production stage and at the final production stage if the batch type production process is employed for the above-mentioned fourth or sixth step, it becomes necessary to adjust the conditions such as temperature or time in the subsequent steps in order to eliminate the effect of the difference over time. Accordingly, production control becomes complicated, and this is one of the factors which reduces productivity.

In order to solve the above problems, although attempts have been made and experiments have been conducted to prepare a product by using a kneading device such as a single axial or twin axial extruder or onrator, a desired kneaded material could not be obtained due to such factors as heat generated during the kneading process. That is, the characteristics of soft candy which has superior softness when initially chewed and which is resistant to adhering to the teeth is obtained mainly in the above-mentioned sixth step, and in the fourth step in which a large quantity of air is incorporated into the mixture. However, in the above-mentioned kneading device, the amount of air incorporated into the mixture becomes insufficient due to such factors as heat generated in the mixing process, and as a result, a mixture having desired properties cannot be obtained.

Also, as for the above-mentioned seventh step, if the method is employed in which an extrusion instrument such as an extruder is used and the nozzle thereof is made duplex to form the product, there are certain limits in the working conditions: for instance, if a raw material is used whose content of fats and oils is, for example, 8% or more, it generates oil stains. Moreover, if the method in which the product is manually prepared is employed, the wrapping amount of the product, and hence, the quality of the product may differ from one product to another. Accordingly, it is not suitable for use in a continuous production process.

The present invention takes into consideration the above-mentioned circumstances, with the object of providing a kneading device which makes possible the introduction of air into the mixture and the continuous conveyance of the mixture while a mixing process is being carried out, as well as providing a ropesizer which is capable of continuously forming a product by wrapping one of the raw material with the other which are continuously conveyed from the above-mentioned kneading device.

DISCLOSURE OF THE INVENTION

The kneading device in one embodiment kneads a raw material of high viscosity and a raw material of low viscosity and continuously delivers a raw material mixture obtained, including: a casing; a pair of screw shafts disposed parallel to each other in the casing; and, a driving unit for rotating the screw shafts, wherein a helical portion is formed at one end of the pair of screw shafts so that the raw material is conveyed from one end of each of the pair of screw shafts to the other end, and a plurality of mixing pins is provided with the other end side of the screw shaft with regard to the helical portion in the circumferential direction of the screw shaft.

In another embodiment, each member of the pair of screw shafts is configured so as to rotate inwardly from top to bottom.

In another embodiment, a mixing pin is provided at the inside of the casing.

In another embodiment, the plurality of mixing pins provided with the pair of screw shafts is arranged at a height so that they overlap with each other between the pair of screw shafts in such a manner that they do not interfere with each other.

In another embodiment, an overlapping portion of the mixing pins between the pair of screw shafts is equal to or less than a half of the height of the mixing pin.

In another embodiment, the plurality of mixing pins are formed in a flat plate shape and are obliquely disposed with respect to a rotation axis of the screw shaft so that the surfaces of the mixing pins facing the other end of the screw shaft face the rotation direction of the screw shaft.

In another embodiment, an introduction opening for the raw material having high viscosity and an introduction opening for the raw material having low viscosity towards the pair of screw shafts are provided separately.

In another embodiment, an outlet for discharging the raw material mixture is provided with the casing at a position below the other end of the screw shaft, and a wiping plate for wiping off the raw material mixture, which is conveyed by the screw shafts, to the outlet is provided with the casing at a position corresponding to the other end of the screw shafts.

In another embodiment, a cover for sealing the inside of the casing is provided with the casing so that 5–50% of the inside volume of the sealed space is empty.

In another embodiment, a kneading device kneads a main raw material of high viscosity and a secondary raw material of liquid or powder and continuously delivers a kneaded raw material obtained, including: a casing having an opened upper portion; a pair of mixing blades disposed parallel to each other in the casing; and, a driving unit for rotating the mixing blades, wherein each of the pair of mixing blades comprises a unit blade of a U-shape continuously attached in a wavy shape, and the pair of the mixing blades rotate with their rotational phases shifted so that they do not interfere with each other.

In another embodiment, each of the pair of mixing blades is configured so as to rotate inwardly from top to bottom.

In another embodiment, an inclined portion facing the other end of the mixing blades is provided with the surface of the mixing blades facing the rotation direction thereof so that the raw materials may be conveyed from one end of the mixing blades to the other end thereof.

In another embodiment, an inclination member is provided for changing the angle of inclination of the inclined portion which is detachably attached to the inclined portion.

In another embodiment, a ropesizer includes a sheet forming unit for elongating a first raw material into a sheet shape; a delivering unit which applies a second raw material onto the first raw material, which is elongated in sheet shape and conveyed by the sheet forming unit, so as to be in a strand form; and, a wrap unit to wrap the sheet shape first raw material, while the sheet shape first raw material is being conveyed, so as to wrap the second raw material, which is applied as a strand form, in the first raw material.

In another embodiment, the ropesizer includes an elongation unit which elongates an intermediate product having a large diameter, which is obtained by wrapping the second raw material in the first raw material by the unit, and produces an intermediate product having a smaller diameter.

In another embodiment, the delivering unit comprises a plurality of cone members arranged with their cone points pointing downwardly so as to be a side surface of a cone, each of the cone members rotating in the same direction around the central axis thereof as a rotation axis as well as rotating in the circumferential direction of the side surface of the cone around the central axis of the cone as a rotation axis so that the second raw material supplied to the inside of the cone is discharged from the bottom portion thereof in a strand form.

In another embodiment, the elongation unit is provided with a conveyance passage which conveys the intermediate product having a smaller diameter in a free state without elongating the intermediate product in order to achieve stress relaxation in the intermediate product being elongated.

BEST MODE FOR CARRYING OUT THE INVENTION

In the following, the present invention will be explained in detail.

Figure 1:
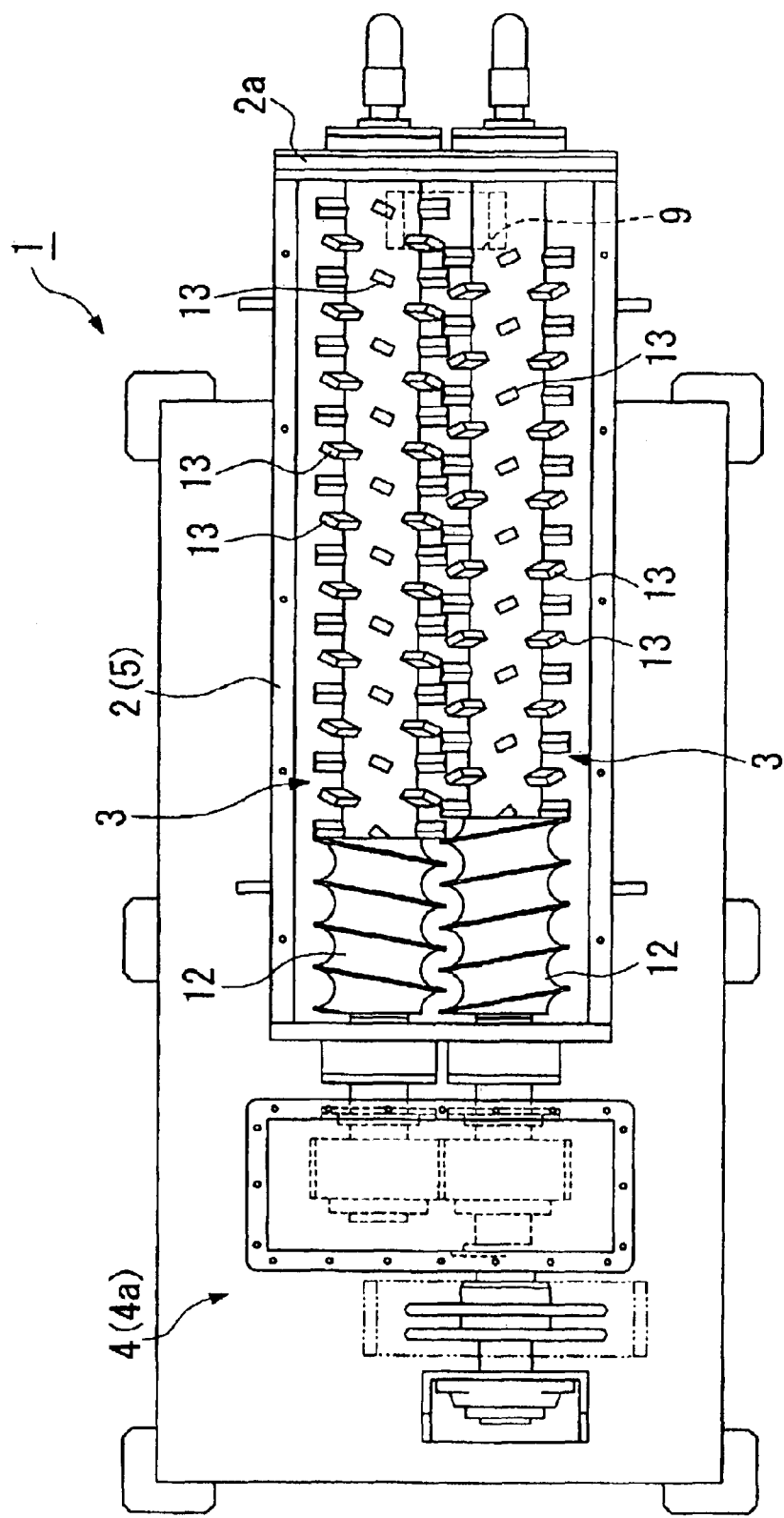
FIG. 1 is a plan view showing a schematic structure of a kneading device according to one aspect of the present invention.
Figure 2:
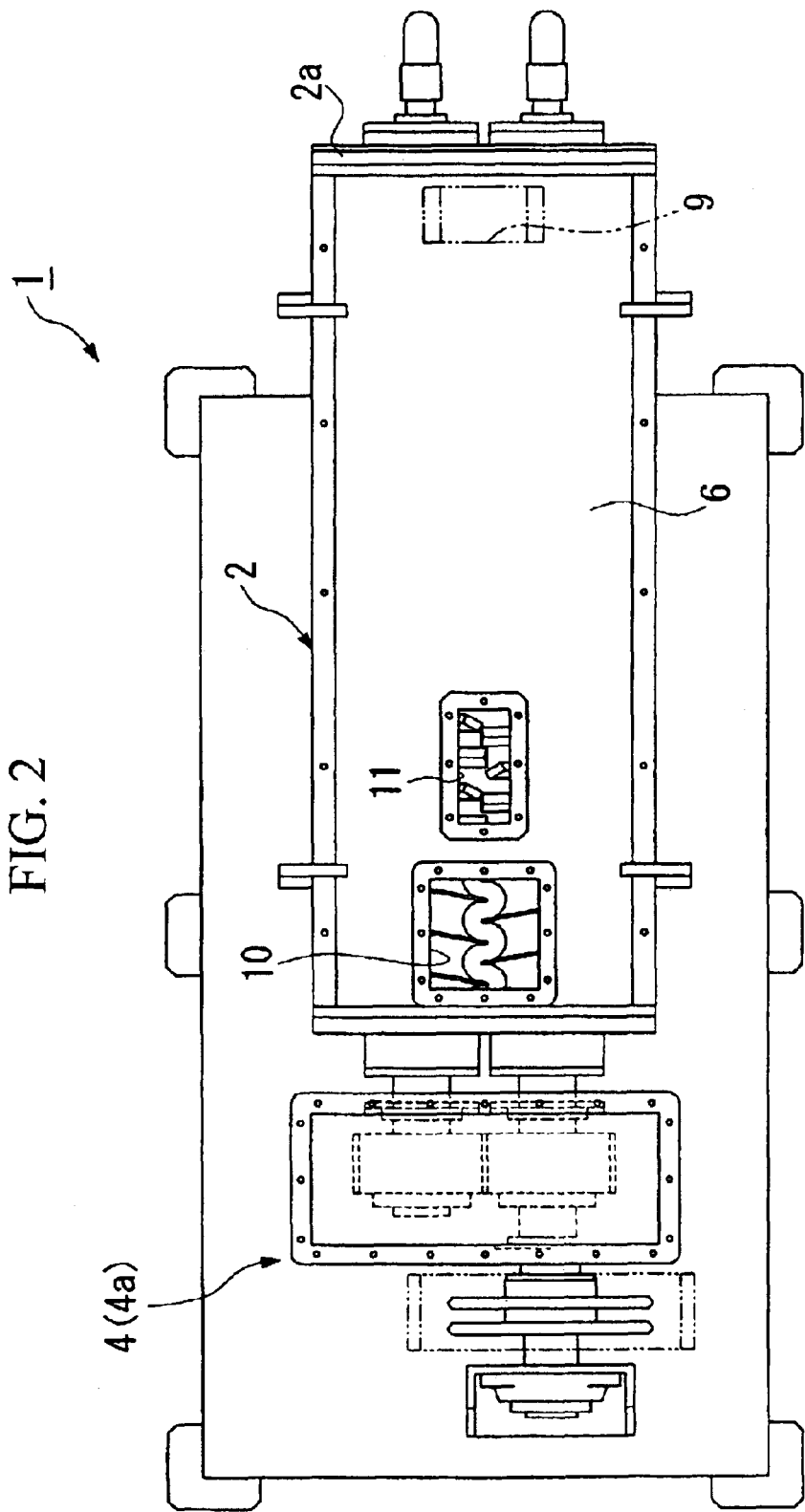
FIG. 2 is a plan view showing the kneading device shown in FIG. 1 in a state in which a cover thereof is closed.

FIGS. 1 and 2 are diagrams showing an embodiment of the kneading device, and the kneading device is indicated by the numeral 1 in these figures. The kneading device 1 is suitably used especially in the production of the above-mentioned soft candy which has a characteristic of superior softness when initially chewed and is resistant to adhering to the teeth, and for instance, the kneading device 1 is used for mixing the soft candy base which is a high viscosity raw material with the low viscosity raw material including fine sucrose crystals while continuously conveying the obtained raw material mixture.

The kneading device 1, as shown in FIG. 1, includes a casing 2, a pair of screw shafts 3 and 3 which are provided in the casing 2 so as to be parallel to each other, and a driving unit 4 for rotating the screw shafts 3 and 3. The casing 2 includes a casing body 5 which is rectangular in plan view as shown in FIG. 3(a), and has a side view of two continuous semicircles as shown in FIG. 3(b), and a cover 6 for covering the upper portion of the opening thereof as shown in FIG. 2.

Figure 3A:
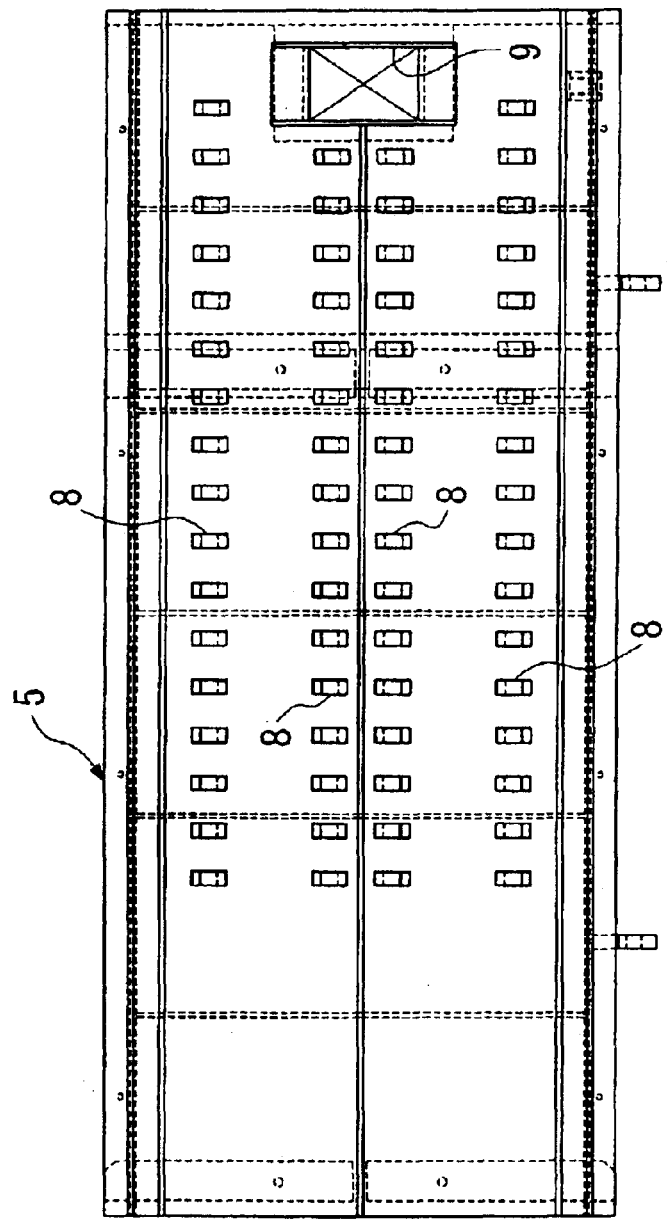
FIG. 3 is a diagram showing a schematic structure of a casing of the kneading device as shown in FIG. 1, and 3(a) is a plan view and 3(b) is a side view.
Figure 3B:
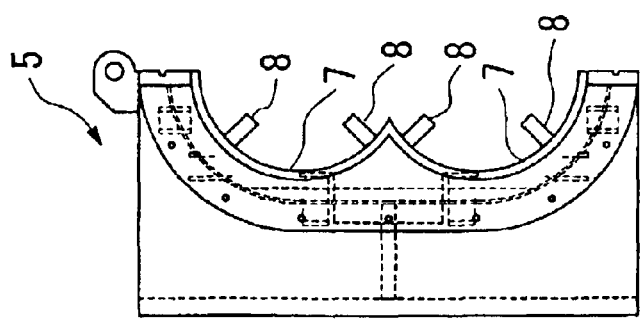

The casing body 5 includes two groove portions 7 and 7 as shown in FIG. 3(b) which are parallel with respect to the longer side of the rectangular plane shown in FIG. 3(a) in order to accommodate the pair of the screw shafts 3 and 3 in parallel to each other. Also, a number of mixing pins 8 of flat plate shape is disposed in an oriented manner inside the casing body 5 as shown in FIGS. 3(a) and 3(b). These mixing pins 8 are disposed so that the front and the back of each mixing pin 8 face the longer side of the casing body 5. In addition, an outlet 9, from which a raw material mixture obtained by mixing the above-mentioned high viscosity raw material and the low viscosity raw material are discharged, is formed at one end, i.e., the downstream side of the casing body 5, as will be described later.

The above-mentioned cover 6, although not shown in the figures, has almost the same structure as the casing body 5 and has a rectangular plan view and a side view of two continuous semicircles so that the above-mentioned screw shafts 3 and 3 may be accommodated in groove portions thereof (not shown in the figures) when it is associated with the casing body 5. Also, as shown in FIG. 2, a high viscosity raw material introduction opening 10 and a low viscosity raw material introduction opening 11 are formed at an upstream side of the cover 6, i.e., the opposite side of the above-mentioned outlet 9 of the casing body 5. Note that a number of mixing pins (not shown in the figures) is also provided with the cover 6, similarly to the casing body 5.

As shown in FIG. 1, each of the screw shafts 3 and 3 is disposed along the above-mentioned groove portions 7 and 7, respectively, of the casing body 5 in parallel to each other. One end (upstream side) of each of the screw shafts 3 and 3 is coupled with the above-mentioned driving unit 4 and the other end (downstream side) thereof is rotatably supported by a side plate 2a of the casing 2. These screw shafts 3 and 3, although not particularly limited, is constructed so as to rotate inwardly from the upper direction to the lower direction in this embodiment. As can be seen from the position of the high viscosity raw material introduction opening 10 and the low viscosity raw material introduction opening 11 shown in FIG. 2, each of the raw materials is introduced/supplied between the pair of the screws 3 and 3. Also, a helical portion 12 is formed at one end of each of the pair of screw shafts 3 and 3 so that the above-mentioned raw materials may be transferred from one end to the other, and the mixing pins 13 are arranged in the circumferential direction of the screw shaft 3 in the region closer to the other end with respect to the helical portion 12.

The helical portion 12, as shown in FIG. 2, is principally disposed under the above-mentioned high viscosity raw material introduction opening 10 of the cover 6 of the casing 2, and transfers the high viscosity raw material introduced from the high viscosity raw material introduction opening 10 towards the downstream side. In this embodiment, the helical portions 12 and 12 of the pair of screw shafts 3 and 3 are disposed, as shown in FIG. 1, in a staggered manner with respect to their convex and concave portions so that they do not interfere with each other and so that the high viscosity raw material supplied to the concave portion thereof may be conveyed to the downstream side when they are rotated in that state, as will be described later.

Figure 4:
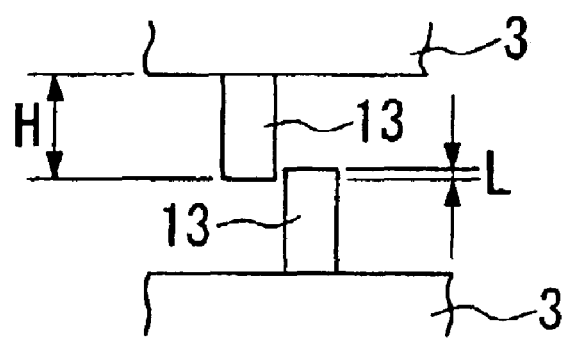
FIG. 4 is an enlarged view showing a main portion for explaining an overlap state of mixing pins.

The mixing pins 13 are disposed in the region from the underneath of the above-mentioned low viscosity raw material introduction opening 11 of the cover 6 of the casing 2 to the outlet 9 of the casing body 5, and they are of a flat plate shape having the same size and shape as the above-mentioned mixing pins 13 provided with the casing body 5. These mixing pins 13 are arranged at a height where they overlap with each other between the screw shafts 3 and 3 in such a manner that they do not interfere with each other. As shown in FIG. 4, the overlapping portion L of the mixing pins 13 between the screw shafts 3 and 3 is equal to or less than a half of the height H of the mixing pin 13 and is about $1/10$ of the height H of the mixing pin 13 in this embodiment. The reason why the overlapping portion L is designed to be equal to or less than the height H of the mixing pin 13 is to prevent the denaturing of the raw materials or the insufficiency in the incorporation of air from occurring due to, as will be described later, generation of heat by the excessive pressure applied to the raw materials when the raw materials are mixed.

Also, the mixing pins 13 are disposed so as to be oblique with respect to the rotation axis (central axis) of the screw shaft 13. That is, in this embodiment, the mixing pins 13 are disposed with their front and back surfaces inclined at 60° with respect to the rotation axis of the screw shaft 3. Moreover, the inclined direction of the mixing pins 13, which are disposed in an oblique manner as mentioned above, is predetermined with respect to the rotary direction of the screw shaft 3. That is, the mixing pins 13 are disposed so that their surfaces facing the other end of the screw shaft 13 (the surface facing the outlet 9 side of the casing body 5) face the rotary direction of the screw shaft 3. Accordingly, the raw materials supplied between the screw shafts 3 and 3 are conveyed towards the downstream side, i.e., the outlet 9, side by being pressed by the above-mentioned surfaces of the mixing pins 13 facing the other end (the surfaces facing the outlet 9 side of the casing body 5).

Figure 5:
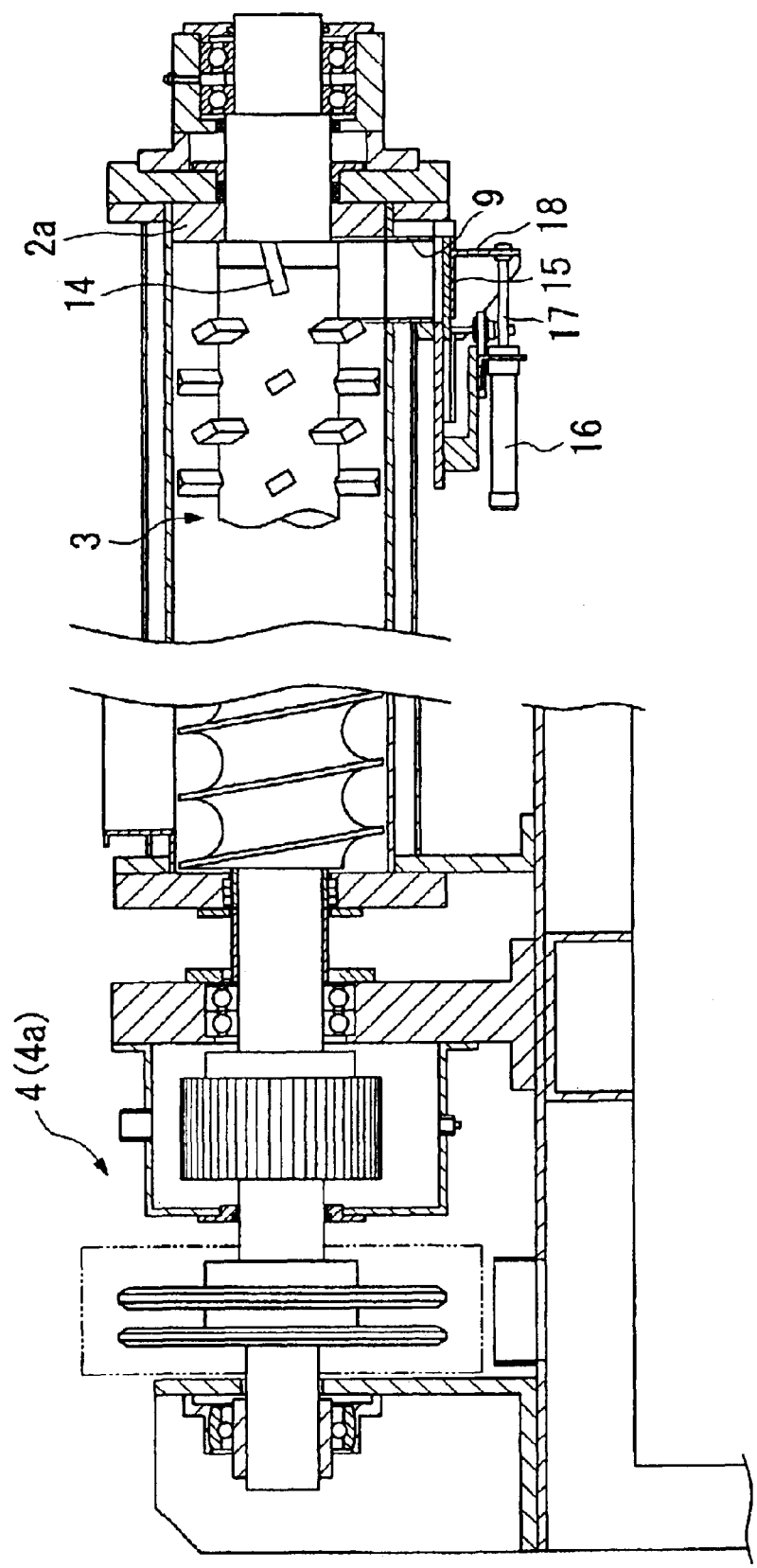
FIG. 5 is a side view showing a schematic structure of a main portion of the kneading device shown in FIG. 1.

Moreover, as shown in FIG. 5, a wiping plate 14, which is used to wipe off the raw materials conveyed by the screw shaft 3, is disposed at the other end portion of the above-mentioned screw 3. The wiping plate 14 is disposed so that the one end portion thereof makes contact with the inside surface of the side plate 2a of the casing 2, and is inclined towards the opposite side of the above-mentioned mixing pin 13. Further, the surface of the wiping plate 14 which is opposite the surface thereof facing the above-mentioned side plate 2a, i.e., the surface facing the upstream side, is disposed so as to face the rotary direction of the screw shaft 3. According to this structure, the raw materials, which are supplied between the screw shafts 3 and 3 are conveyed towards the side plate 2a by being pressed by the mixing pins 13, drop into the outlet 9 disposed below by their own weight when they are wiped off from the inside surface of the side plate 2a by being pushed by the surface of the wiping plate 14 facing the upstream side.

The outlet 9 is formed by an opening penetrating the casing body 5, and a shutter 15 which covers the outside, i.e., the lower side, opening of the outlet in an openable—closable manner. The shutter 15 is attached to a piston 17 of an air-cylinder 16, which is attached to the casing body 5, via a bracket 18. The shutter 15 opens and closes the outlet 9 in accordance with the actuation of the air-cylinder 16.

The driving unit 4, as mentioned above, supports one end (upstream side) of the screw shafts 3 and 3, and rotates them in that state. The driving unit 4 has a known, conventional structure and includes a motor (not shown in the figures), and a transmittance means 4a which transmits the rotary force of the motor to the screw shafts 3 and 3.

In the kneading device 1 having the above-described structure, the size of the screw shafts 3 and 3 is determined to be relatively small so that 5–50%, preferably 20–45%, more preferably 30–40% of the volume inside the casing 2 is available as space. In this manner, the generation of excessive heat from the raw materials due to such factors as friction may be prevented when the raw materials are mixed by the screw shafts 3 and 3.

When the soft candy base, which is a high viscosity raw material, and the low viscosity raw material including the fine sucrose crystal are mixed by using the kneading device 1 having the above-mentioned structure, the cover 6 of the casing body 5 and the above-mentioned shutter 15 are first closed, and then each of the screw shafts 3 and 3 is rotated at a predetermined speed. After that, in this state of the device, the high viscosity raw material and the low viscosity raw material are introduced into the device from the high viscosity raw material introduction opening 10 and the low viscosity raw material introduction opening 11, respectively.

Then, pressure is applied to the high viscosity raw material, which is introduced between the helical portions 12 and 12 of the inwardly rotating screw shafts 3 and 3, and is proceeded forward by the action of the convex portions of the helical portions 12 in a kneaded state to some extent towards the region where the mixing pins 13 are disposed. Also, the low viscosity raw material, which is directly introduced to the region where the mixing pins 13 are disposed, is mixed with the high viscosity raw material, which has been kneaded is some degree, and is kneaded further by the mixing pins 8 of the casing body 5 and the mixing pins (not shown in the figures) of the cover 6.

At that time, since the overlapping portion of the mixing pins 13 between the pair of screw shafts 3 and 3 is sufficiently small as mentioned above, it is possible to prevent an excessive pressure being applied to each of the raw materials. Accordingly, the denaturing of the raw materials or the insufficient incorporation of air due to the generation of heat are prevented. Also, since 5–50%, preferably 20–45%, and more preferably 30–40% of the volume inside the casing 2 is space, the generation of excessive heat from the raw materials due to such factors as friction during a kneading process is prevented.

Each of the raw materials kneaded by the mixing pins 13, etc., in the above-mentioned manner, is traveled forward by the mixing pins 13 while its degree of mixing is increased by the kneading process. That is, since the surface of the mixing pin 13 at the downstream side is obliquely disposed so as to face the rotary direction of the screw shafts 3 and 3 as mentioned above, the raw materials are conveyed towards the downstream side by the rotation of the screw shafts 3 and 3 while being pressed by the surface of the mixing pin 13 facing the downstream side.

In this manner, the raw materials are gradually conveyed towards the downstream side. When the raw material at the front is conveyed to the side plate 2a side (the outlet 9 side) of the casing 2 and a predetermined amount of the raw materials, i.e., the raw material mixture including the sufficiently kneaded high viscosity raw material and low viscosity raw material, is collected, the shutter 15 is opened by actuating the above-mentioned air-cylinder 16. Then, the raw material mixture collected at the side plate 2a side is wiped off from the inside surface of the side plate 2a by the operation of the above-mentioned wiping plate 14, and drops into the outlet 9 disposed below by the weight thereof. The dropped raw materials are continuously conveyed by a belt conveyer (not shown in the figures) placed below the outlet 9 to the subsequent process.

Note that although the shutter 15 is initially closed in order to collect the predetermined amount of the raw material mixture, it is opened until the kneading process is completed after the predetermined amount of the raw material mixture is once collected and discharged. In this manner, a desired amount of the raw material may be continuously kneaded and sent to the subsequent process.

In the above-mentioned kneading device 1, since the helical portion 12 and the number of mixing pins 13 are provided with each of the pair of the screw shafts 3 and 3 and each of the screw shafts 3 and 3 is rotated inwardly from top to bottom, it becomes possible to continuously convey the raw material mixture from one end of the screw shafts 3 and 3 to the other end thereof while the high viscosity raw material and the low viscosity raw material are kneaded by the helical portions 12 and the mixing pins 13.

Also, since the mixing pins 8 are provided inside the casing body 5 as well as the inside of the cover 6 (mixing pins thereof are not shown in the figures), the kneading process for the raw materials is efficiently carried out in association with the mixing pins 13 provided with the screw shafts 3 and 3.

Moreover, since the height of the mixing pin 13 provided with the screw shafts 3 and 3 is adjusted so that the mixing pins 13 of the different screw shafts 3 and 3 overlap each other, the kneading effect of the device may be improved.

Further, since the overlapping portion of the mixing pins 13 between the screw shafts 3 and 3 is designed to be equal to or less than the height of the mixing pin, it becomes possible to prevent the denaturing of the raw material or the insufficient incorporation of the air due to an excessive pressure applied to the raw materials when the high viscosity raw material and the low viscosity raw material are kneaded.

In addition, since the mixing pins 13 are formed into a flat plate shape and these are disposed so as to be oblique with respect to the rotation axis of the screw shaft 3 and the surface thereof faces the other end of the screw shaft 3 with respect to the rotation direction of the screw shaft 3, i.e., the outlet 9 side, the raw material supplied between the screw shafts 3 and 3 may be pressed towards the outlet 9 side while being kneaded by the mixing pins 13. Accordingly, it becomes possible to continuously convey the raw material towards the outlet 9 side.

Also, since the high viscosity raw material introduction opening, through which the raw material is supplied between the pair of the screw shafts 3 and 3, and the low viscosity raw material introduction opening are separately provided, in particular because the high viscosity raw material introduction opening is disposed at the upstream side, it becomes possible to enhance the degree of mixing of the raw materials by adding the low viscosity raw material to the high viscosity raw material which has been kneaded in advance.

Moreover, since the outlet 9 for discharging the raw material mixture is disposed at a position below the other end portion of the screw shafts 3 and 3 of the casing body 5 of the casing 2 and the wiping plate 14 for wiping off the raw material mixture conveyed by the screw shafts 3 and 3 into the outlet 9 is disposed at the other end portion of the screw shafts 3 and 3, it becomes possible to automatically and continuously wipe off the raw material mixture obtained by the kneading process by using the wiping plate 14 so that the mixture drops into the outlet 9. Accordingly, the process may be reliably continued in the subsequent process by using such means as a belt-conveyer which connects the outlet 9 to the subsequent process.

Further, since the casing 2 is constructed so that 5–50%, preferably 20–45%, and more preferably 30–40% of the volume inside thereof is available as space, it becomes possible to prevent the denaturing of the raw materials or the insufficient incorporation of air due to the generation of excessive heat caused by such factors as friction during the kneading process.

Next, another embodiment of the kneading device, according to the present invention will be explained.

Figure 6:
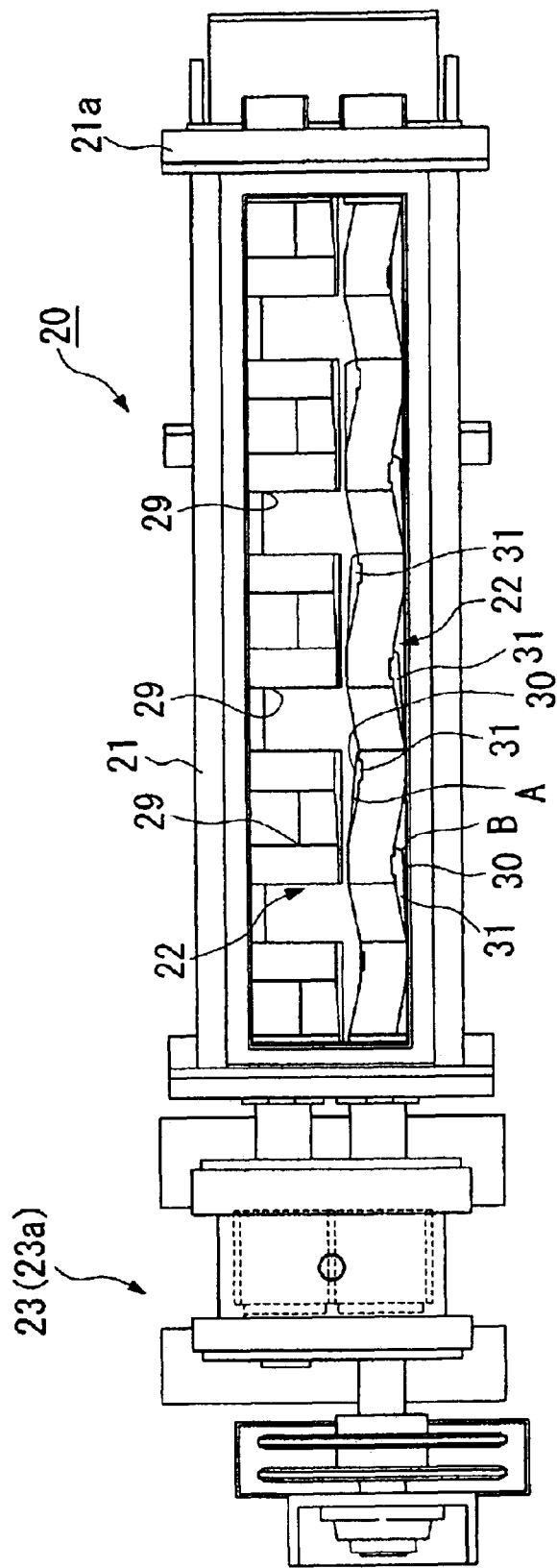
FIG. 6 is a plan view showing a schematic structure of a kneading device according to one aspect of the present invention.

FIG. 6 is a diagram showing a schematic structure of the kneading device and the kneading device is indicated by the numeral 20 in FIG. 6. The kneading device 20, similar to the kneading device 1 shown in FIG. 1, may be suitably used especially for the production of the above-mentioned soft candy. The kneading device 20 may be used, for instance, for adding liquid or powdered secondary raw materials, such as frappe, food flavorings, food color, or acids, to a main material which is a mixture (the raw material mixture) obtained by using the kneading device 1 shown in FIG. 1 in the above-mentioned sixth step, and for mixing (kneading) the two materials to produce a kneaded material which may be used as a soft candy material containing a large quantity of air. Also, the kneading device 20 may be used for continuously conveying the soft candy material.

Figure 7:
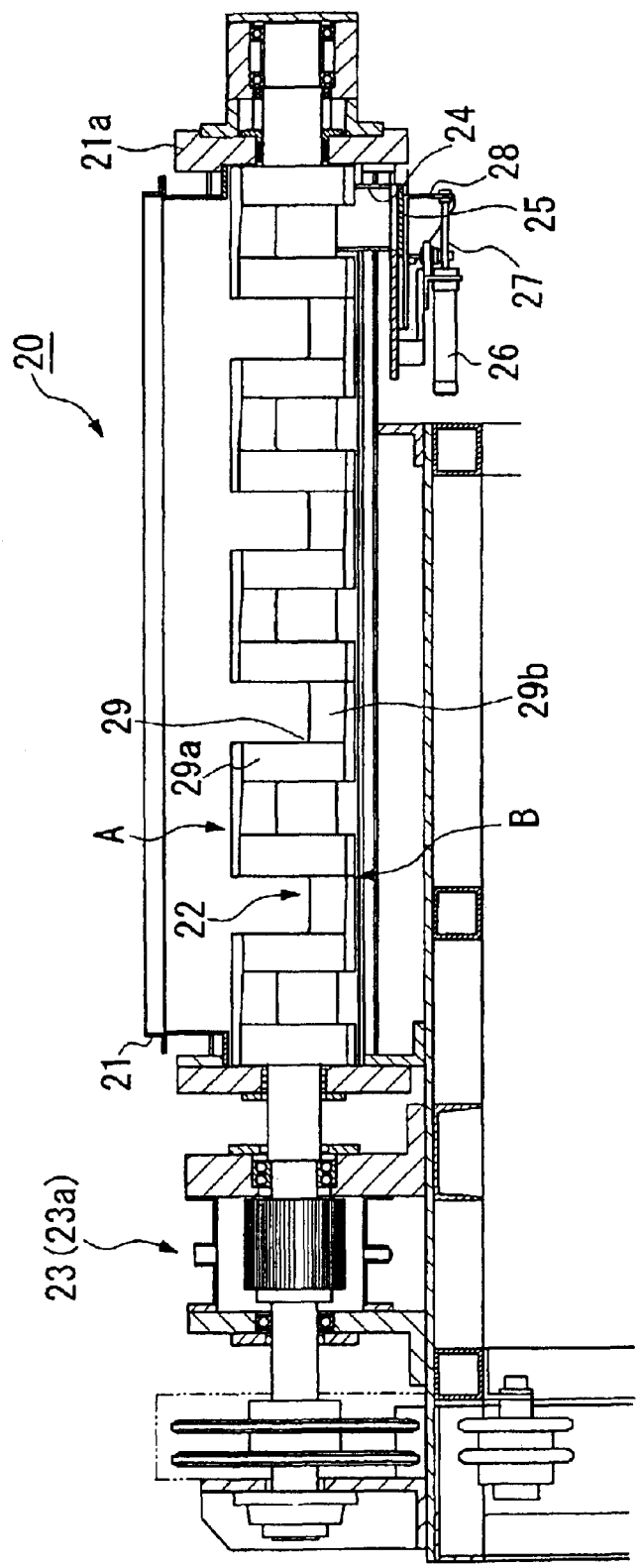
FIG. 7 is a side view showing a schematic structure of a main portion of the kneading device shown in FIG. 6.

The kneading device 20 includes a casing 21 whose upper portion is opened, a pair of mixing blade 22 which is disposed in the casing 21 so that the blades are parallel to each other, and a driving unit 23 for rotating the mixing blades 22. The casing 21 is of a rectangular parallelopiped having a rectangular plan view, and it has an opened upper portion and an outlet 24 at a bottom face of the downstream side, the side for discharging the kneaded material obtained by kneading the above-mentioned main raw material and the secondary raw materials as shown in FIG. 7.

The outlet 24 is formed by an opening penetrating the casing 22 similar to the above-mentioned outlet 9 of the kneading device 1, and a shutter 25 which covers the outside, i.e., the downside, opening of the outlet in an openable—closable manner. The shutter 25 is attached to a piston 27 of an air-cylinder 26, which is attached to the casing 22, via a bracket 28. The shutter 25 opens and closes the outlet 24 in accordance with the actuation of the air-cylinder 26.

Each of the mixing blades 22 and 22 is formed by a unit blade 29 having a U-shape which are continuously attached so as to form wavy shape and, as shown in FIG. 6, the mixing blades 22 and 22 are disposed along the longer side of the above-mentioned casing 21 in a manner parallel to each other. An end portion (the upper streamside) of these mixing blades 22 and 22 is coupled to the above-mentioned driving unit 23 and the other end (the downstream side) thereof is rotatably supported by a side plate 21a of the casing 21. Also, although not particularly limited thereto, these mixing blades 22 and 22 are configured so that they rotate inwardly from top to bottom in this embodiment and that each raw material is introduced/supplied between the mixing blades 22 and 22. In this embodiment, as shown in FIG. 1, these mixing blades 22 and 22 rotate with their rotation phases being shifted so that the unit blades 29 thereof do not interfere with each other. That is, the timing of rotation of the mixing blades 22 and 22 is determined so that when one of the mixing blades 22 is in horizontal position with its unit blades 29 facing the widthwise direction, the other one of the mixing blades 22 is in a vertical position with its unit blades 29 facing the lengthwise direction.

Also, as mentioned above, the mixing blade 22 is formed by the unit blade 29 having a U-shape which is continuously attached so as to form a wavy shape, and a longitudinal bar 29a and a lateral bar 29b are disposed so as to be alternately connected. In order to convey the above-mentioned raw material from one end of the mixing blade 22 to the other end, an inclined portion 30 facing the other end of the mixing blade 22 is provided with the surface of the lateral bar 29a facing the rotation direction of the mixing blade 22.

That is, when the lateral bar 29b is in the position indicated by the letter A in FIG. 6 (i.e., the upper side position indicated by the letter A in FIG. 7), the portion A rotates inwardly, and hence, the surface of the inclined portion 30 of the portion A, which faces the other end of the mixing blade 22, faces the inside of the rotation direction as shown in FIG. 6. On the other hand, when the lateral bar 29b is in the position indicated by the letter B in FIG. 6 (i.e., the lower side position indicated by the letter B in FIG. 7), the portion B rotates outside, and hence, the surface of the inclined portion 30 of the portion B, which faces the other end of the mixing blade 22, faces the outside of the rotation direction as shown in FIG. 6.

The above-mentioned inclined portion 30 has a relatively large angle of inclination of, for instance, about 5–15° and, with this angle of inclination, the raw materials supplied are conveyed towards the other end of the mixing blade 22, i.e., the outlet 24 side while being kneaded. Also, an inclination member 31 for changing the inclination angle of the inclined portion 30 is detachably attached to the inclined portion 30 by a fixing member (not shown in the figures) such as a bolt. The inclination member 31 is formed as a wedge shape so as to decrease the inclination angle of the inclined portion 30 in order to prolong the residence time of the raw material, especially by reducing the conveying speed thereof in accordance with the characteristics of the raw material. Note that it is possible to attach the inclination member 31 having a different inclination angle to each position of the inclined portion 30 in order to suitably adjust the conveying speed of the raw material in accordance with the position in the casing 21.

The driving unit 23, as mentioned above, is used to support one end (the upstream side) of the mixing blades 22 and 22 and to rotate them in that state, and has a known, conventional structure including a motor (not shown in the figures), and a transmittance means 23a which transmits the rotary force of the motor to the mixing blades 22 and 22.

Also, in the kneading device 20, since the casing 21 is formed so that the upper portion thereof is openable, the main material and the secondary raw materials may be introduced therein from anywhere at the opened upper portion, i.e., the upper opening side. Accordingly, the introduction position may be suitably selected in accordance with such factors as the properties of each of the raw materials.

In order to mix and knead the main raw material which includes the mixture (the raw material mixture) obtained by using the kneading device 1 shown in FIG. 1 with the secondary raw materials such as frappe, flavor, food color, or food acid by using the kneading device 20 having the above-mentioned structure, first of all, the inclination member 31 is attached to each inclined portion 30 of the mixing blades 22, if necessary, and the conveying rate of the raw materials, i.e., the residence time for the raw materials, is appropriately determined prior to the kneading process. Also, the position for introducing the main raw material and the secondary raw materials, respectively, is predetermined based on such factors as the properties of the raw materials. In this embodiment, the main raw material is introduced into the most upstream side of the upper opening of the casing 21, i.e., between the mixing blades 22 and 22 at the driving unit 23 side, and the flavorings, the food color, the food acid, and the frappe may be introduced, in that order, from the upstream side to the downstream side.

After the above-mentioned preparatory step, the shutter 25 of the casing 21 is closed and the mixing blades 22 and 22 are rotated at a predetermined rotating speed. Then, in this state, the main raw material and each of the secondary raw materials are continuously introduced/supplied from the predetermined introduction position.

Then, the main raw material and the secondary raw materials, which are introduced between the mixing blades 22 and 22 rotating inwardly, are conveyed towards the outlet 24 side by the inclined portion 30 while being pressed and kneaded between the mixing blades 22 and 22.

At that time, since each lateral bar 29b of the pair of mixing blades 22 and 22 rotates at a large radius, it plays a role in significantly elongating the raw materials being kneaded. Accordingly, the lateral bar 29b, in particular, makes the raw materials change into a so-called "pulling candy state" by significantly elongating the raw materials so that an aeration effect is exerted by which a sufficient amount of air is incorporated into the raw materials. Note that the effect of the aeration is significantly improved since the upper portion of the casing 21 is opened so that the inside of the casing 21 is always filled by air and the raw materials make contact with the air.

The raw materials in which air is incorporated and which are kneaded in the manner mentioned above, are conveyed while their degree of kneading (mixing) is enhanced by the mixing blades 22 and 22. That is, as mentioned above, since the inclined portion 30 is provided with each of the lateral bars 29b, the raw materials are conveyed towards the outlet 24 side by being pressed against the inclined portion 30 by the rotation of the mixing blades 22 and 22 and are pushed towards the downstream side.

In this manner, the raw materials are gradually conveyed towards the downstream side. When the raw material at the front is conveyed to the side plate 21a side (the outlet 24 side) of the casing 21 and a predetermined amount of the raw materials, i.e., the raw material mixture including the sufficiently kneaded main raw material and secondary raw materials, is collected, the shutter 25 is opened by actuating the above-mentioned air-cylinder 26. Then, the raw material mixture collected at the side plate 21a side drops into the outlet 24 disposed below by their weight, etc. The dropped raw materials are continuously conveyed by a belt conveyer (not shown in the figures) which is placed below the outlet 24 to the subsequent process.

Note that although the shutter 25 is initially closed in order to collect the predetermined amount of the raw material mixture, similarly to the one of the kneading device 1 shown in FIG. 1, it is opened until the kneading process is completed after the predetermined amount of the raw material mixture is once collected and discharged. In this manner, a desired amount of the raw materials may be continuously kneaded and sent to the subsequent process.

In the above-mentioned kneading device 20, since the mixing blades 22 and 22 have the structure in which the U-shaped unit blades 29 are continuously attached in a wavy shape and these mixing blades 22 and 22 rotate with their rotation phase shifted so that they do not interfere with each other, it becomes possible to significantly elongate the raw materials being kneaded by, in particular, each of the lateral bars 29 of the mixing blades 22 and 22 which rotates at a large radius.

Also, since the upper portion of the casing 21 is open, the raw materials may be continuously in contact with air by filling the inside of the casing 21 with air. Accordingly, the aeration effect may further be improved. Moreover, since the upper portion of the casing 21 is open, the introduction position for the raw materials may be arbitrary determined. Accordingly, if the type of product produced is changed and the main raw material or the secondary raw materials are also substituted by other types of raw materials, and therefore, the properties such as viscosity of the raw materials are changed, it is possible to readily make an adjustment so that the residence time in the kneading device 20 or the mixing time with the other material is changed. Furthermore, since the upper portion of the casing 21 is open, it is easy to wash the inside thereof. Accordingly, it becomes possible to respond to, for instance, changes in type of products, readily and quickly.

In addition, since the inclined portion 30 is provided with the mixing blades 22 and 22, it becomes possible to transfer the raw materials towards the outlet 24 side while it is kneaded and to discharge the kneaded raw materials from the outlet 24 by simply rotating the mixing blades 22 and 22.

Also, since the inclination member 31, which changes the inclination angle of the inclined portion 30, is detachably attached to the inclined portion 30, it is possible to suitably set or change the conveying speed for the raw materials, i.e., the residence time of the raw materials. Accordingly, it becomes possible to select the conveying speed and the residence time which is most suitable for the combination of the main material and the secondary raw materials used.

Next, a ropesizer according to an embodiment of the present invention will be explained.

Figure 8:
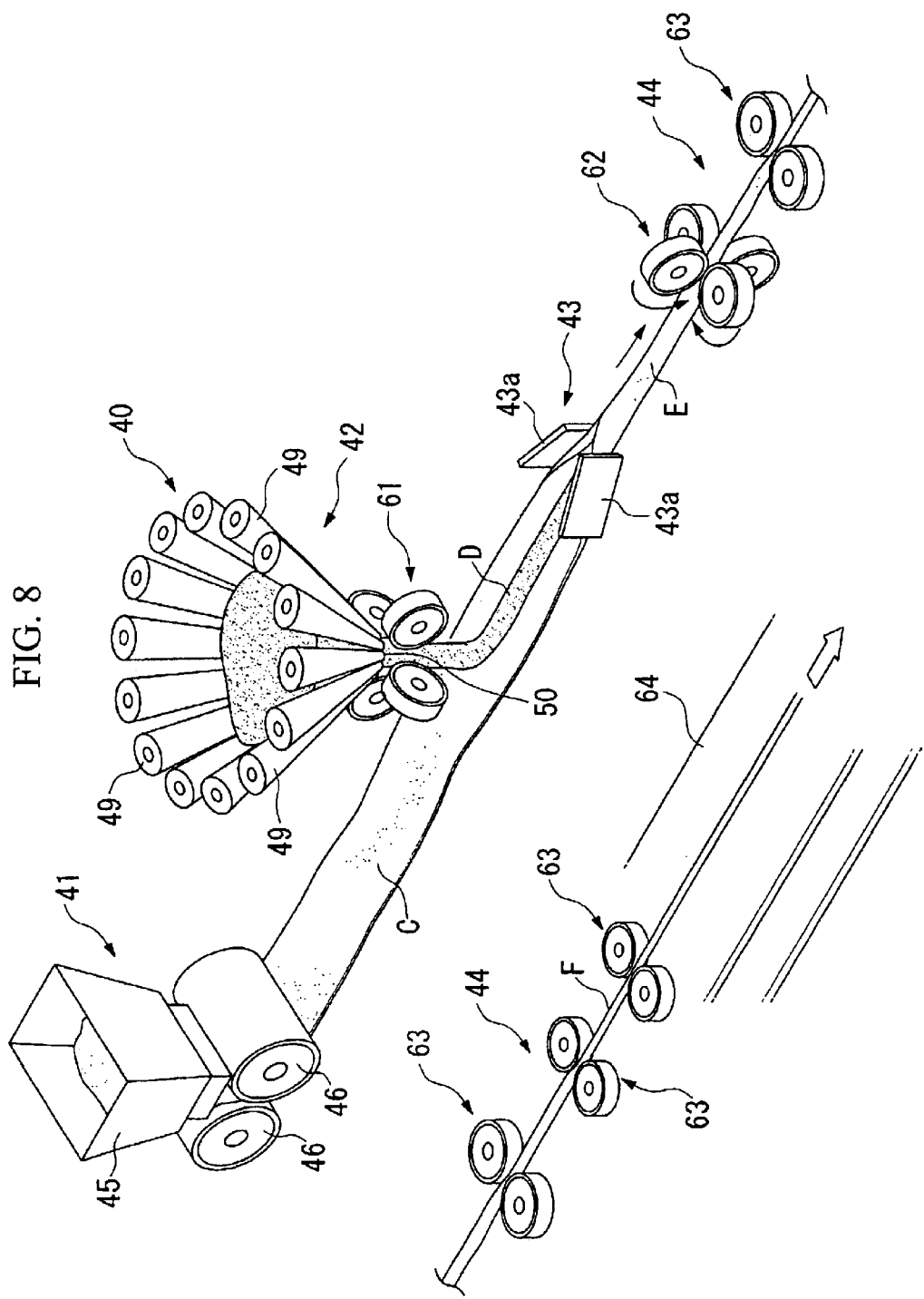
FIG. 8 is a diagram showing a schematic structure of a ropesizer according to one aspect of the present invention.

FIG. 8 is a diagram showing a schematic diagram of a ropesizer according to an embodiment the present invention. In FIG. 8, the ropesizer is indicated by the numeral 40. The ropesizer 40 may be suitably used in, for instance, the above-mentioned seventh step, and forms the first raw material and the second raw material, which are prepared by using the kneading device 2 shown in FIGS. 6 and 7 and have different flavors, into a product shape by wrapping one of the raw materials with the other.

The ropesizer 40 includes a sheet forming unit 41 for elongating the first raw material C into a sheet shape, a delivering unit 42 which applies the second raw material D onto the first raw material C, which has been elongated into a sheet shape and has been delivered from the sheet forming unit 41, so as to be in a strand form, a wrapping guide 43 which is a wrapping means for wrapping the sheet type first raw material C and which wraps the second raw material D which has been applied in a strand form, by the first raw material C being delivered, and an elongation unit 44 which elongates an intermediate product of larger diameter including the first raw material C and the second raw material D wrapped by the first raw material C by the wrapping guide 43 so as to form an intermediate product of smaller diameter.

The sheet forming unit 41 is of a known conventional type and includes a supply container 45 which stores the supplied first raw material having high viscosity and transfers it downwardly by dropping it, and a pair of rollers 46 and 46 disposed below the supply container. In the sheet forming unit 41 having the above-mentioned structure, for instance, the first raw material transferred from the above-mentioned kneading device 20 is stored in the supply container 45 and is then continuously dropped between the rollers 46 and 46 at a predetermined rate so that the first raw material may be drawn into a sheet shape and be continuously extruded between the rollers 46 and 46 to be transferred onto a belt conveyer (not shown in the figures).

Figure 9:
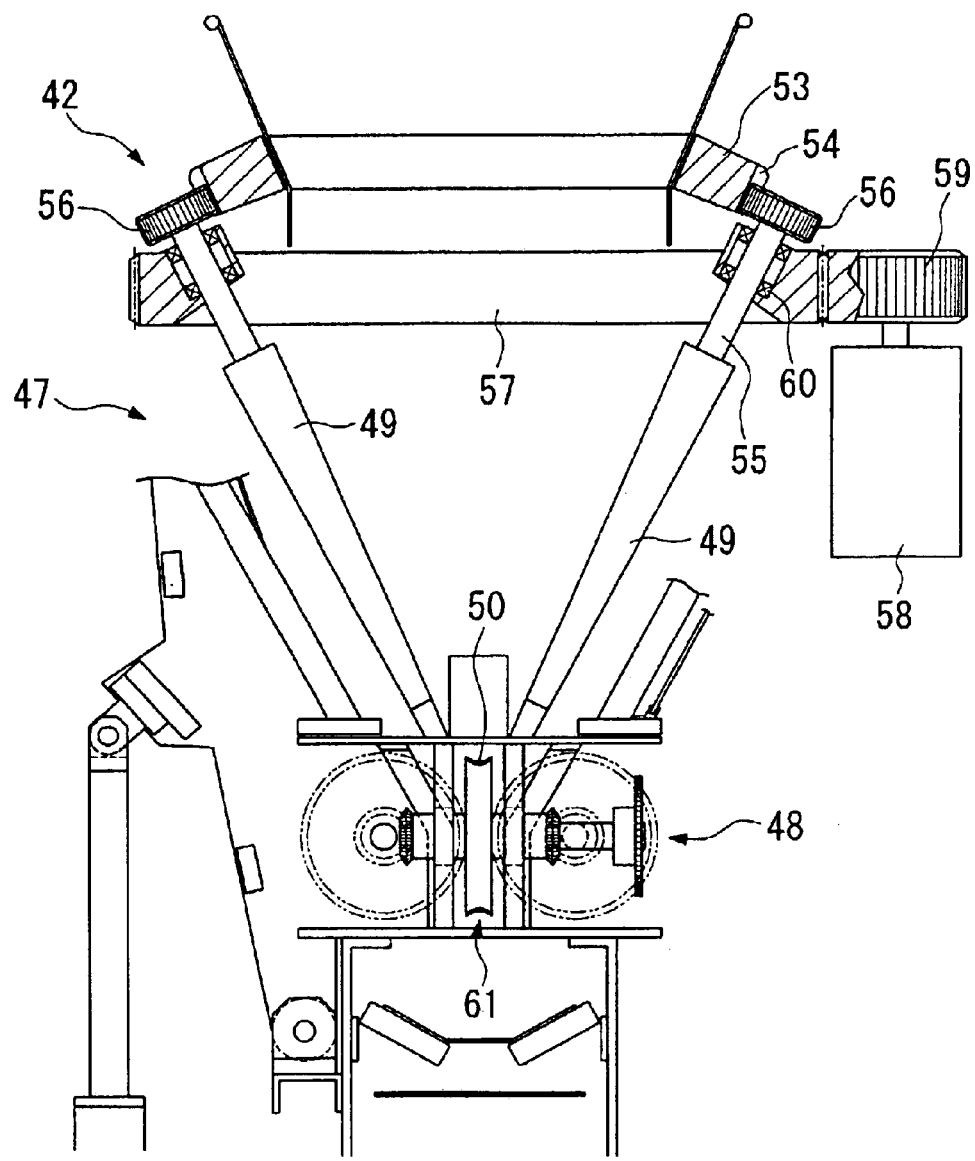
FIG. 9 is a diagram showing a schematic structure of a delivering unit in the ropesizer shown in FIG. 8.

The delivering unit 42, as shown in FIG. 9, includes an extrusion portion 47 which stores and extrudes the supplied second raw material having high viscosity, and a delivering portion 48 which delivers the second raw material extruded from the extrusion portion 47 in a lace shape.

The extrusion portion 47 is formed by a number of cone members 49, each of which has a long and narrow cone shape and is arranged so as to be a part of the side surface of a cone. An outlet 50 is formed at a bottom by being surrounded by cone points of the above-mentioned cone members 49. A fixing ring 53, which is fixed by a fixing member not shown in the figures, is disposed at a bottom surface side of the cone members 49 (i.e., the upper side) so as to surround the circumference of the bottom surface of the cone formed by the above-mentioned cone members 49. Teeth 54 are disposed at the outer peripheral surface of the fixing ring 53 so as to continuously surround the entire circumference of the fixing ring 53. A gear 56 is provided with the cone member 49 at the bottom surface side via a shaft 55, and the gear 56 is engaged with the teeth 54 of the above-mentioned fixing ring 53.

Also, a rotary ring 57 is disposed below the above-mentioned fixing ring 53. The rotary ring 57 is rotatably attached to a supporting member not shown in the figures, and the above-mentioned shaft 55 of the cone member 49 is rotatably supported by the peripheral portion of the rotary ring 57 in a state obliquely penetrating therein. Moreover, the bottom portion, i.e., the cone point, of the cone member 49 is in a rotatable state while maintaining the oblique state in order to form the outlet 50 as mentioned above. Accordingly, the cone member 49 is in a state obliquely hung from the above-mentioned rotary ring 57, and is rotatably supported thereby. In this embodiment, the angle of inclination of the cone member 49 is in the range between about 20° and 30° with respect to the vertical direction.

A driving mechanism for rotating the cone member 49 is provided with the rotary ring 57. The driving mechanism includes a motor 58, a driving gear 59 attached to a rotary shaft (not shown in the figures) of the motor 58, and a transmission member 60 which is provided between the driving gear 59 and one of the cone members 49. In the driving mechanism, the driving gear 59 is rotated by the action of the motor 58, and this rotary force is transmitted to the shaft 55 of one of the cone members 49 via the transmission member 60.

The cone member 49 coupled with the transmission member 60 in the above-mentioned structure, rotates around the shaft 55 when the rotary force of the motor 58 is transmitted. When the cone member 49 rotates around the shaft 55 thereof, it also rotates the gear 56 in a coupled manner. Then, since the gear 56 is coupled with the above-mentioned teeth 54 of the fixing ring 53, the fixing ring 53 is fixed to a fixing member 51, and since the rotary ring 57 is rotatably attached with respect to the supporting member (not shown in the figures), the cone member 49 having the above-mentioned gear 56 moves in the circumferential direction of the fixing ring 53 (the length direction of the teeth 54) by means of the rotation of the gear 56.

When the cone member 49, which is directly coupled with the driving mechanism, moves in the circumferential direction of the fixing ring 53, i.e., when the cone member 49 revolves, the rotary ring 57 which holds the cone member 49 is of course rotated, and accordingly, the other cone members 49 which are not directly coupled with the above-mentioned driving mechanism are also revolved. At that time, the cone members 49, which are not directly coupled with the above-mentioned driving mechanism, rotate around the shaft 55 thereof due to the rotation force generated by the revolution since the gear 56 thereof is engaged with the teeth 54 of the fixing ring 53.

Accordingly, all of the cone members 49 rotate in the same direction around the shaft 55 thereof (a central axis) as well as revolve in the circumferential direction of the side surface of a cone formed by the cone members 49. In this structure, the extrusion portion 47, when the second raw material is supplied to the inside of the cone formed by the cone members 49, guides the second raw material to the bottom portion by the rotation and revolution of the cone members 49 so as to adjust the state of the raw material from lump to lace, and extrudes it from the outlet 50.

The delivering portion 48 is disposed below the above-mentioned outlet 50, and includes feeding rollers 61 formed by a pair of rollers, or four rollers (crisscross rollers) (four rollers are shown in FIGS. 8 and 9). The feeding rollers 61 are disposed so as to oppose each other with a predetermined space therebetween, and a groove (not shown in the figures) having a cross-section of substantially a U-shape is formed on the outer peripheral surface thereof. Also, the opening portion of the feeding rollers 61 is positioned so as to be directly below the above-mentioned outlet 50, and the feeding rollers 61 facing the opening portion rotate from top to bottom by means of a driving source not shown in the figures.

The delivering portion 48, having the structure described above, receives the second raw material, which is extruded from the extrusion portion 47, at the opening portion of the feeding rollers 61, and forms the material into the shape of the opening portion between the feeding rollers, i.e., a lace shape, while guiding the material downwardly. The delivering portion 48, as shown in FIG. 8, supplies the second raw material in that state onto the center portion of the sheet-shape first raw material C which has been conveyed by the belt conveyer (not shown in the figures).

The wrapping guide 43, as mentioned above, is used to wrap the second raw material D, which is supplied in a lace shape, by the sheet-shape first raw material C, and includes a pair of guiding plates 43a and 43a disposed on the belt conveyer (not shown in the figures). The distance between the pair of guiding plates 43a and 43a gradually decreases from the upstream side to the downstream side of the conveyance direction of the above-mentioned raw materials C and D, and the guiding plates 43a and 43a are obliquely disposed so that the inside surface of the guiding plates faces downwardly. The distance between the guiding plates 43a and 43a at the upstream end thereof, which is the greatest, is adjusted so that it greater longer than the width of the sheet-shape first raw material conveyed. Also, the distance between the guiding plates 43a and 43a at the downstream end thereof is adjusted so that both ends of the above-mentioned sheet-shape first raw material C sufficiently cover the top of the second raw material D so that the first raw material wraps the second raw material.

The wrapping guide 43 having the above-mentioned structure, receives the sheet type first raw material C which is conveyed by the belt conveyer and the second raw material D supplied onto the center portion of the first raw material C, and gradually lifts both ends of the sheet type first raw material C by means of the pair of guiding plates 43a and 43a. When the both ends of the sheet type second raw material C are sufficiently lifted, they hang towards the inside by the weight thereof and eventually cover the second raw material D. Therefore, the wrapping guide 43 produces an intermediate product E of large diameter by wrapping the lace-shaped second raw material D, which is put on the center portion of the sheet type first raw material C, by the first raw material. Note that the wrapping guide which may be used in the present invention is not limited to the above-mentioned wrapping guide 43, and such devices as a belt conveyer, by which a raw material may be gradually rounded into a cylindrical shape as it proceeds forward, may also be employed.

The elongation unit 44 is used to elongate the intermediate product E having a large diameter, which is obtained by using the wrapping guide 43, in order to produce an intermediate product F having a smaller diameter as well as to freely contract the intermediate product F. The elongation unit 44 includes a crisscross roller 62 made of four rollers which are arranged in a cross shape, a plurality of pairs of forming rollers 63, and a conveyance passage 64 which conveys an intermediate product obtained from the forming rollers 63 in a free state.

The crisscross roller 62 and each of the forming rollers 63 are disposed along the conveyance passage 64 such as a belt conveyer (not shown in the figures). The crisscross roller 62 is formed by the four rollers, each of which possesses a groove (not shown in the figures) having a cross-section of substantially a U-shape formed on the outer peripheral surface thereof. An opening portion, whose size is a little smaller (narrower) than the outer diameter of the above-mentioned intermediate product E of a large diameter, is formed at the center portion of the four rollers arranged in the cross-shape. Also, since the above-mentioned four rollers are coupled by a driving source not shown in the figures, they rotate inwardly from top to bottom with respect to the direction of the flow of the intermediate product E as indicated by arrows in FIG. 8. Accordingly, the intermediate product E which is conveyed from the wrapping guide 43 is elongated in the opening portion while being compressed and reduced in diameter therein, and is transferred to the forming rollers 63 located at the downstream side.

Four or five pairs of the forming rollers 63 are provided in accordance with the targeted diameter of a final product, and a groove (not shown in the figures) having a cross-section of substantially a U-shape is formed on the outer peripheral surface thereof. An opening is provided between the rollers of the forming rollers 63. The opening of the forming rollers 63 which is placed immediately after the above-mentioned crisscross roller 62 is formed so as to be a little smaller (narrower) than the opening of the crisscross roller 62, and the openings of the other forming rollers is formed so as to be progressively smaller in order from the upstream side of the flow of the intermediate product to the downstream side. Also, the forming rollers 63 rotate inwardly from the upstream side of the flow of the intermediate product to the downstream side. Accordingly, each of the forming rollers 63 having the above-mentioned configuration elongates the intermediate product, which has been reduced in diameter and is elongated by the crisscross roller 62, to have a diameter substantially as required for the final product by sequentially reducing the diameter and elongating the intermediate product using each of the forming rollers 63, and produces an intermediate product F.

The conveyance passage 64 is disposed immediately after the above-mentioned forming roller 63 which is located at the most downstream side, and may include such element as a belt conveyer. The conveyance passage 64 is used to convey the intermediate product F, which has been elongated by the forming rollers 63, for a predetermined distance (predetermined time) in a free state without further elongating the intermediate product. That is, since the intermediate product F is made of the raw material having high viscosity and is obtained from the forming rollers 63 by which it is elongated and reduced in diameter, an excessive elongation is given to the intermediate product F by the rapid pressurization and elongation. Accordingly, while the intermediate product is conveyed by the conveyance passage 64 in a free state without being elongated, the intermediate product F enters a stable state since the excessive elongation is relieved by the stress.

In order to form the first raw material and the second raw material as a product, in which one of the raw materials is wrapped by the other, by using the above-mentioned ropesizer 40, the first raw material and the second raw material having different flavors, which have been produced by using the kneading device 20 shown in FIGS. 6 and 7, are prepared, and then the first raw material and the second raw material are introduced into the sheet forming unit 41 and the delivering unit 42, respectively.

The first raw material introduced into the supply container 45 of the sheet forming unit 41 is continuously dropped between the rollers 46 and 46 at a predetermined rate so as to be elongated in a sheet shape by the rollers 46 and 46, and is continuously extruded between the rollers 46 and 46 as the first raw material C of a sheet shape to be transferred onto the belt conveyer (not shown in the figures).

The second raw material introduced into the delivering unit 42, on the other hand, is guided to the bottom portion side of the extrusion portion 47 by the rotation and the revolution of the cone members 49 so as to be adjusted in shape from a lump state to a lace state, and be extruded from the outlet 50. At that time, since the second raw material is moved to the bottom side by the rotation and the revolution of the cone members 49, excessive pressure is not applied to the raw material, and hence, even if the oil and fat content of the raw material is high, it is not affected by the applied pressure and a superior extruding operation becomes possible. Note that since there is a danger that the temperature of the raw material will become extraordinary high and the raw material will flow between the cone members 49 and 49, or stick to the cone members 49 during the above-mentioned operation, it is possible to send cold air to the extrusion portion 47 if necessary.

When the second raw material is extruded from the outlet 50 in the manner explained above, the second raw material is formed into the shape of the opening between the rollers, i.e., the lace shape, to be the second raw material D, and is supplied onto the center portion of the first raw material C.

The sheet type first raw material C produced in the manner explained above and the second raw material D supplied onto the center portion of the first raw material C are conveyed to the wrapping guide 43 by means of a belt conveyer (not shown in the figures), and the intermediate product E having a large diameter is produced by lifting both end portions of the sheet type second raw material C so as to wrap the lace shape second raw material D which is supplied onto the center portion of the raw material C.

When the intermediate product E having a large diameter is produced in the manner mentioned above, the intermediate product E is guided to the elongation unit 44 and is sequentially elongated and reduced in diameter by the crisscross roller 62, and the forming rollers 63 to be produced as the intermediate product F. The intermediate product F is further guided to the conveyance passage 64 and is conveyed in a free state without being elongated so that it enters a stable state in which the excessive elongation is relieved by the stress. The intermediate product F is then transferred to a next process, for instance, a cutting process or a wrapping process.

In the ropesizer 40 having the above-mentioned configuration, since the extrusion portion 47 of the delivering unit 42 is formed by the plurality of cone members 49, which rotate at the same time they revolve, it becomes possible to extrude the raw material from the outlet 50 in lace shape without applying an excessive pressure to the raw material, and accordingly, even if the oil and fat content of the raw material is high, it is not affected by the applied pressure, and an excellent extruding operation onto the sheet shape first raw material becomes possible.

Also, since the conveyance passage 64 is provided with the elongation unit 44, it becomes possible to achieve a stress relaxation for the intermediate product F, to which an excessive elongation is given due to a rapid pressurization and elongation, by conveying it in a free state without performing elongation using the conveyance passage. Accordingly, it becomes possible to stabilize a predetermined cross section and the length of the intermediate product F, and hence, the shape of the product when it is cut may be stabilized.

Note that the use of the above-mentioned kneading device 1, the kneading device 20, and the ropesizer 40 is not limited to the above-mentioned production of soft candy, and may be applied to the production of various foods.

Also, the shape and the combination of each component explained in each of the embodiments may be altered based on such factors as design requirements as long as they are within the spirit of the invention.

INDUSTRIAL APPLICABILITY

As explained above, since the kneading device according to an embodiment of the invention includes a pair of screw shafts provided with a helical portion and a plurality of mixing pins, it becomes possible to knead a raw material of high viscosity and a raw material of low viscosity and to continuously deliver a raw material mixture obtained from one end of the screw shafts to the other end by using the helical portion and the mixing pins.

The kneading device in another aspect is a kneading device in which each member of the pair of screw shafts is configured so as to rotate inwardly from top to bottom. Accordingly, the kneading effect by the screw shafts is further improved.

The kneading device in another aspect is a kneading device in which a mixing pin is provided at the inside of the casing. Accordingly, the kneading process for the raw material may be effectively carried out in association with the mixing pins provided with the screw shafts.

The kneading device in another aspect is a kneading device in which the plurality of mixing pins provided with the pair of screw shafts is arranged at a height so that they overlap with each other between the pair of screw shafts. Accordingly, the kneading effect is improved by the overlap of the mixing pins.

The kneading device in another aspect is a kneading device in which an overlapping portion of the mixing pins between the pair of screw shafts is equal to or less than a half of the height of the mixing pin. Accordingly, it becomes possible to prevent the denaturing of the raw materials or the insufficient incorporation of air due to the generation of heat caused by excessive pressure applied to the raw materials during the kneading process of the raw material having high viscosity and the raw material having low viscosity.

The kneading device in another aspect is a kneading device in which the plurality of mixing pins are formed in a flat plate shape and are obliquely disposed with respect to a rotation axis of the screw shaft so that the surfaces of the mixing pins facing the other end of the screw shaft face the rotation direction of the screw shaft. Accordingly, it becomes possible to press the raw materials supplied between the screw shafts while the materials are kneaded, and hence, it becomes possible to continuously convey the raw material.

The kneading device in another aspect is a kneading device in which an introduction opening for the raw material having high viscosity and an introduction opening for the raw material having low viscosity towards the pair of screw shafts are provided separately. Accordingly, for a case where the introduction opening for the raw material having high viscosity is disposed at an upstream side, in particular, the degree of mixing of the raw materials may be improved by adding the raw material having low viscosity to the raw material having high viscosity which has been kneaded in advance.

The kneading device in another aspect is a kneading device in which an outlet for discharging the raw material mixture is provided with the casing at a position below the other end of the screw shaft, and a wiping plate for wiping off the raw material mixture, which is conveyed by the screw shafts, to the outlet is provided with the casing at a position corresponding to the other end of the screw shafts. Accordingly, it becomes possible to automatically and continuously wipe off the raw material mixture obtained by the kneading process by using the wiping plate so that the mixture drops into the outlet. Therefore, the process may be reliably continued in the subsequent process by using such means as a belt-conveyer which connects the outlet to the subsequent process.

The kneading device in another aspect is a kneading device in which a cover for sealing the inside of the casing is provided with the casing so that 5–50% of the inside volume of the sealed space is empty. Accordingly, it becomes possible to prevent the denaturing of the raw materials or the insufficient incorporation of air due to the generation of excessive heat caused by such factors as friction during the kneading process.

The kneading device according to another embodiment of the invention is a kneading device in which each of the pair of mixing blades includes a unit blade of a U-shape continuously attached in a wavy shape, and the pair of the mixing blades rotate with their rotational phases shifted so that they do not interfere with each other. Accordingly, it becomes possible to significantly elongate the raw materials being kneaded by, in particular, each of lateral bars of the mixing blades which rotates at a large radius, and an aeration effect is exerted by which a sufficient amount of air is incorporated into the raw materials. Also, since the upper portion of the casing is open, the raw materials may be continuously in contact with air by filling the inside of the casing with air. Accordingly, the aeration effect may further be improved. Moreover, since the upper portion of the casing is open, the introduction position for the raw materials may be arbitrary determined. Accordingly, if the type of product produced is changed and the main raw material or the secondary raw materials are also substituted by other types of raw materials, and therefore, the properties such as viscosity of the raw materials are changed, it is possible to readily make an adjustment so that the residence time in the kneading device or the mixing time with the other material is changed. Furthermore, since the upper portion of the casing is open, it is easy to wash the inside thereof. Accordingly, it becomes possible to respond to, for instance, changes in type of products, readily and quickly.

The kneading device in another aspect is a kneading device in which each of the pair of mixing blades is configured so as to rotate inwardly from top to bottom. Accordingly, the kneading effect and the aeration effect by the mixing blades may further be improved.

The kneading device in another aspect is a kneading device in which an inclined portion is provided with the mixing blades. Accordingly, the raw materials may be conveyed from one end of the mixing blades to the other end thereof while being kneaded by simply rotating the mixing blades.

The kneading device in another aspect is a kneading device further including an inclination member for changing the angle of inclination of the inclined portion which is detachably attached to the inclined portion. Accordingly, it is possible to suitably set or change the conveying speed for the raw materials, i.e., the residence time of the raw materials. Therefore, it becomes possible to select the conveying speed and the residence time which is most suitable for the combination of the main material and the secondary raw materials used.

The ropesizer in another embodiment is a ropesizer including a sheet forming unit; a and a wrap unit. Accordingly, it becomes possible to elongate the first raw material into a sheet shape, apply the second raw material onto the elongated first raw material so as to be in a lace shape, and wrap the second raw material applied in a lace shape in the sheet type first raw material while they are being conveyed.

The ropesizer in another aspect is a ropesizer further including an elongation unit. Accordingly, an intermediate product having a large diameter, in which the second raw material is wrapped in the first raw material by the elongation unit, may be elongated to produce an intermediate product having a smaller diameter.

The ropesizer in another aspect is a ropesizer in which the extrusion portion of the delivering unit is formed by the plurality of cone members, which rotate at the same time they revolve, it becomes possible to extrude the raw material from the outlet thereof in lace shape without applying an excessive pressure to the raw materials, and accordingly, even if the oil and fat content of the raw material is high, it is not affected by the applied pressure, and an excellent extruding operation onto the sheet shape first raw material becomes possible.

The ropesizer in another aspect is a ropesizer in which the elongation unit is provided with a conveyance passage. Accordingly, it becomes possible to achieve stress relaxation in the intermediate product having smaller diameter, which has been elongated, in order to stabilize a predetermined cross section and the length of the intermediate product having smaller diameter so that the shape of the product when it is cut may be stabilized.

What is claimed is:

1. A kneading device comprising:

a casing having an opened upper portion;

a pair of mixing blades disposed parallel to each other in said casing; and a drive unit to rotate said mixing blades, wherein each of said pair of mixing blades comprises a unit blade of a U-shape continuously attached in a wavy shape, and said pair of the mixing blades rotate with their rotational phases shifted so that they do not interfere with each other, and each said mixing blade includes an inclined portion oriented towards an outlet end of said mixing blades, said inclined portion including a surface to face a rotation direction and being structured so that, in use, raw materials are continuously conveyed towards the outlet end.

2. A kneading device according to claim 1, wherein each of said pair of mixing blades is configured so as to rotate inwardly from top to bottom.

3. A kneading device according to claim 1, wherein a longitudinal bar and a lateral bar are provided with said mixing blades so as to be alternately connected.

4. A kneading device according to claim 1, wherein said inclined portion has an inclination angle of inclination about 5–15°.

5. A kneading device, comprising:

a casing having an opened upper portion;

a pair of mixing blades disposed parallel to each other in said casing; and a drive unit to rotate said mixing blades, wherein each of said pair of mixing blades comprises a unit blade of a U-shape continuously attached in a wavy shape, and said pair of the mixing blades rotate with their rotational phases shifted so that they do not interfere with each other, and an inclined portion oriented towards an outlet end of said mixing blades is provided with a surface of said mixing blades facing a rotation direction thereof so that raw materials are conveyed towards the outlet end, said kneading device further comprising:

an inclination member for changing the angle of inclination of said inclined portion which is detachably attached to said inclined portion.

* * * * *